(12) United States Patent
Alsop et al.

(10) Patent No.: US 6,476,181 B1
(45) Date of Patent: Nov. 5, 2002

(54) INCREASED VOLATILE REMOVAL DURING SOLID PHASE PROCESSING OF NYLON 6 BY TEMPERATURE PROGRAMMING

(75) Inventors: Albert W. Alsop, Wilmington, DE (US); David N. Marks, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/872,302

(22) Filed: Jun. 1, 2001

(51) Int. Cl.[7] .................. C08G 69/46; C08G 69/16
(52) U.S. Cl. .............. 528/323; 528/170; 528/310; 528/480; 528/481; 528/503
(58) Field of Search ............... 528/310, 323, 528/480, 481, 503, 170

(56) References Cited

U.S. PATENT DOCUMENTS

| | | | | |
|---|---|---|---|---|
| 4,755,590 A | * | 7/1988 | Kubánek et al. | 528/503 |
| 4,816,557 A | | 3/1989 | Pipper et al. | 528/500 |
| 5,576,415 A | | 11/1996 | Tanaka | 528/310 |
| 5,596,070 A | | 1/1997 | Gotz | 528/310 |
| 5,773,555 A | * | 6/1998 | Weger et al. | 528/480 |
| 5,859,180 A | | 1/1999 | Giordano et al. | 528/347 |
| 5,973,105 A | * | 10/1999 | Wiltzer et al. | 528/323 |
| 6,069,228 A | | 5/2000 | Alsop et al. | 528/310 |
| 6,194,537 B1 | * | 2/2001 | Rave et al. | 528/310 |
| 6,326,457 B1 | * | 12/2001 | Erbes et al. | 528/480 |

* cited by examiner

*Primary Examiner*—P. Hampton-Hightower
(74) *Attorney, Agent, or Firm*—Gerald E. Deitch

(57) ABSTRACT

Process for increasing the molecular weight of nylon 6 while reducing its content of caprolactam and other volatiles by a two-staged heating process.

2 Claims, 3 Drawing Sheets

INCREASED VOLATILE REMOVAL DURING SOLID PHASE PROCESSING OF NYLON 6 BY TEMPERATURE PROGRAMMING

BACKGROUND OF THE INVENTION

1. Field of the Invention

This invention relates to a method for controlling the increase in the molecular weight of nylon 6 during solid phase polymerization while simultaneously reducing the amount of caprolactam and oligomers in the nylon 6.

2. Prior Art

U.S. Pat. No. 4,816,557 discloses a process which involves preheating nylon 6 granules to a temperature of not less than 100 degrees C. and then passing the granules downward through a treatment zone which is heated from 130 to 210 degrees C. A countercurrent of superheated steam is present in the treatment zone. There is no discussion of polymerization and affecting polymerization rates by sequential temperature exposure.

U.S. Pat. No. 5,576,415 discloses a method for drying polyamide and then increasing its molecular weight by solid-phase treatment. The moisture content of the polyamide is regulated at the glass transition temperature of the polyamide, and then the polyamide is heat-treated. The heat treatment involves first heating the polyamide at a pressure of at least one atmosphere, without decreasing the moisture content, for a time sufficient to produce a polyamide with up to 15% crystallinity. Then the polyamide is heated at a temperature lower than the melting point of the polyamide at reduced pressure. No discussion of solid phase polymerization at temperatures below the preheating temperature in order to slow polymerization rate is made.

U.S. Pat. No. 5,596,070 discloses solid state polymerization of polymers at a temperature 5 to 100 degrees C. below the melting point of the polymers, wherein the solid state polymerization occurs in the presence of an inert gas which contains at least 50% by volume of superheated steam. While disclosing temperatures, gas flow rates and compositions, this patent does not disclose using heat treatment to slow molecular weight buildup to allow time for escape of undesirable volatiles.

U.S. Pat. No. 5,859,180 discloses a process for the solid state polycondensation of polyamide resins, wherein ratio of the throughput by weight of an inert gas fed to a reactor and the throughput by weight of the polymer at a reactor outlet is lower than 0.5. Techniques including preheating are disclosed, but the use of preheating then cooling as a means of slowing the rate of molecular weight increase is not disclosed.

U.S. Pat. No. 6,069,228 discloses solid phase polymerization of nylon 6 with simultaneous removal of polyamide precursors and caprolactam. No technique for slowing the relative rate of molecular weight build up relative to extractable removal is taught.

SUMMARY OF THE INVENTION

The present invention is a process for making nylon 6 having a desired molecular weight and a desired caprolactam content, comprising (1) heating nylon 6 having an initial molecular weight less than the desired molecular weight and an initial caprolactam content greater than the desired caprolactam content to a first temperature in the range of 130 to 220 degrees centigrade in the presence of an inert gas;

(2) maintaining said first temperature for a time sufficient to raise the molecular weight of the nylon 6 by 5% to 95% of the difference between said initial molecular weight and the desired molecular weight;

(3) lowering the temperature of said nylon 6 to a second temperature at least 1 degree centigrade below said first temperature; and (4) maintaining said second temperature for a time sufficient to achieve the desired caprolactam content and the desired molecular weight.

DETAILED DESCRIPTION OF THE INVENTION

Many condensation polymers, such as nylon 6, can be increased in molecular weight by solid phase polymerization. Solid phase polymerization is typically carried out by passing a hot inert gas flow through a heated bed of polymer granules. A conflict can arise if the solid phase processing of the nylon 6 is being done to remove volatiles (such as caprolactam), as well as to increase molecular weight. If volatile removal requires more time than the time required to increase the molecular weight, then the polymer molecular weight may be excessively high by the time the volatile concentration has been lowered to the desired level. This situation can arise due to the presence of additives in the polymer such as polyamidation catalysts that result in high solid phase polymerization rates. High initial polymer molecular weights combined with high caprolactam content can also result in a situation where low volatile content with desired molecular weight may not be achievable.

Figure 1:
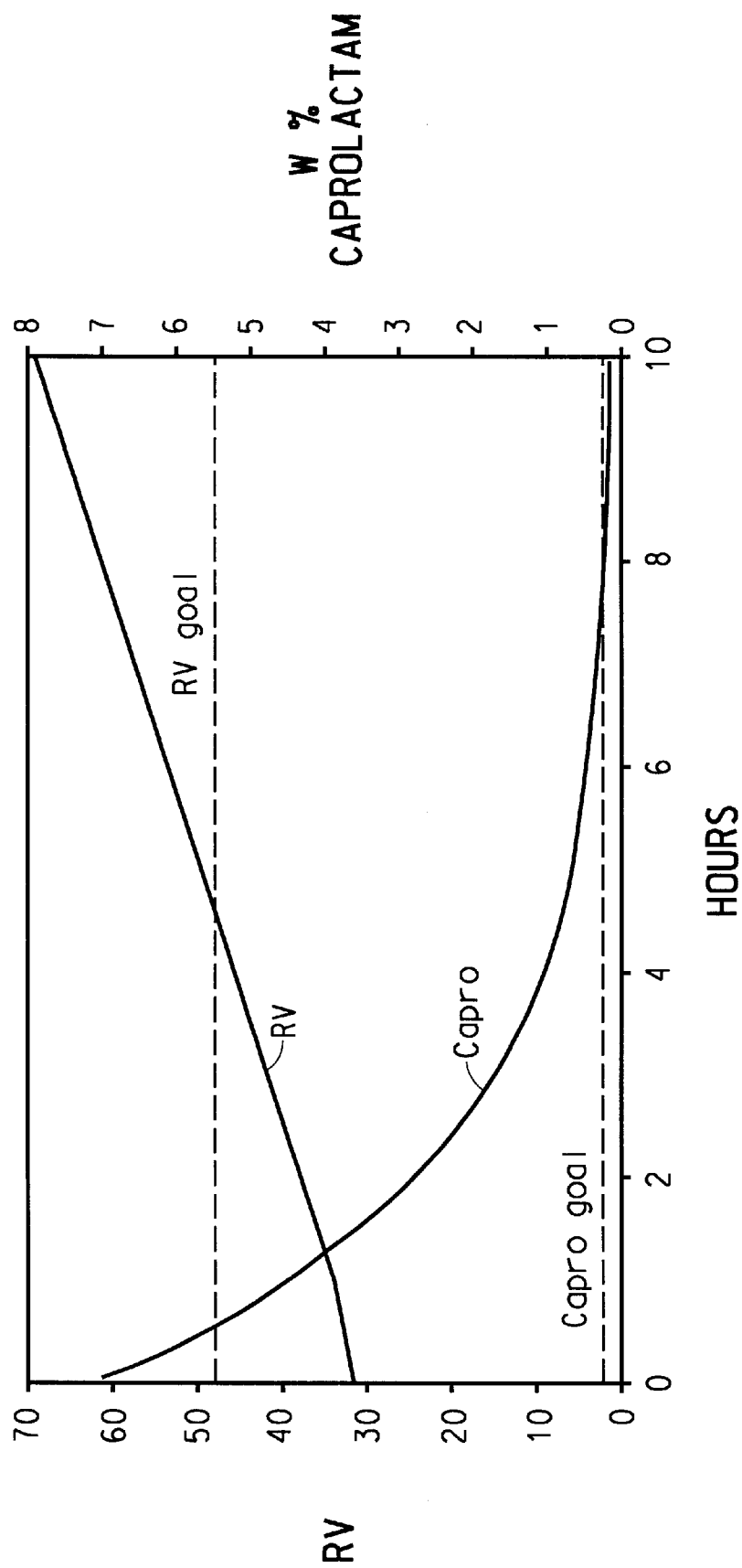
FIGS. 1, 2 are graphs showing the relative viscosity and caprolactam content of nylon 6 treated using a single temperature treatment.

FIG. 1 shows a simulation of an experiment where nylon 6 polymer of moderate molecular weight and high residual caprolactam content is solid phase polymerized in the presence of a counter-current flow of dry nitrogen gas. (Other inert gases also may be used.) The polymer being used in this simulation is nylon 6 manufactured in an autoclave, cast as a ribbon directly from the polymerizer, water quenched and chopped into particles. These particles are then remelted in an extruder and die cast then chopped to produce cylindrical pellets suitable for solid phase polymerization. The upper curve displays the rise in relative viscosity (RV) over time. The discontinuity in the RV curve is the result of an initial heatup to operating temperature. The lower curve shows the decline in caprolactam content over time. The two horizontal dashed lines show the desired RV value and the maximum allowable caprolactam content. The RV goal is 48, and the maximum caprolactam content is 0.2 weight percent (w %). The arrows associated with each curve point to the scale axis for the curve. The RV reaches its goal of 48 after approximately 4 hours, while the caprolactam does not fall below the desired specification of 0.2 w % for almost eight hours. By eight hours the RV is greater than 60. In order to attain the goal caprolactam content, the RV goal has been exceeded by greater than 12 units of RV.

Figure 2:
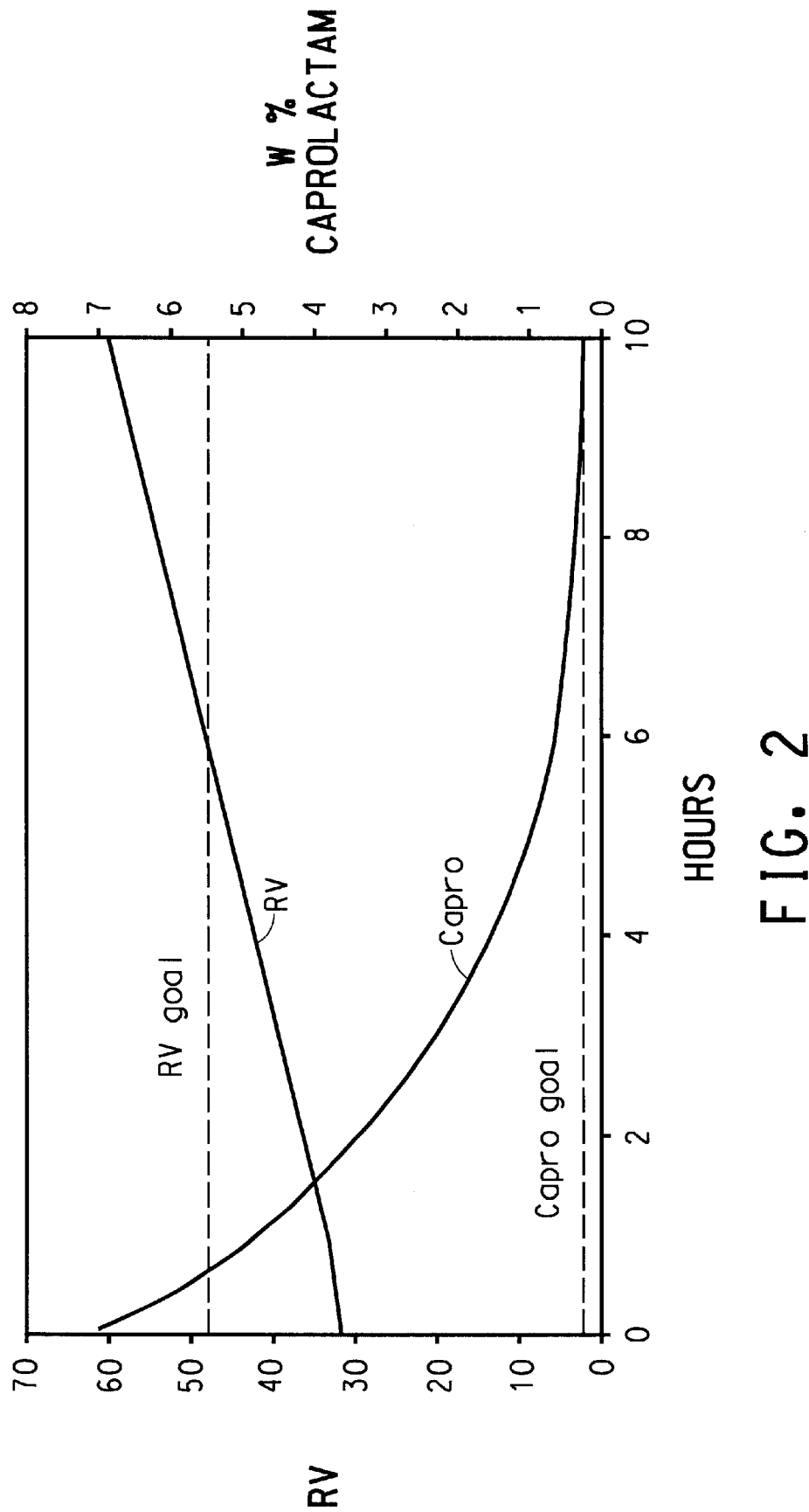

FIG. 2 shows the RV and caprolactam levels versus time for the same polymer processed at a lower temperature. The RV in this case reaches its goal of 48 after more than 5 hours, while the caprolactam does not fall below the desired specification of 0.2 w % for almost nine and a half hours. By nine and one half hours the RV is almost 60. In order to attain the goal caprolactam content, the RV goal has been exceeded by nearly 12 units of RV. This result indicates that processing at lower temperatures for much longer periods might attain both desired RV and residual caprolactam content. However in many cases, treatment for these extended times is not economical.

By preheating the nylon 6 to a temperature above the solid phase processing temperature, the relative rates of volatile removal and molecular weight (or RV) increase may be modified. This is done without the addition of additives to the polymer that may have adverse effects on polymer properties (like dye-ability). This approach eliminates additional processing of the polymer to remove volatiles or the addition of additives to slow solid phase polymerization. This added processing would increase the cost of manufacturing the final product. Cooling of the polymer between the two stages of heating may be done to increase the efficacy of the technique.

The heating may be done in batch fashion with the two heating steps separated by a cool down period. Alternatively the heating may also be done in a continuous fashion by preheating the nylon 6 to the first temperature and then passing the nylon 6 to a lower temperature region to allow caprolactam removal while slowly building molecular weight.

Figure 3:
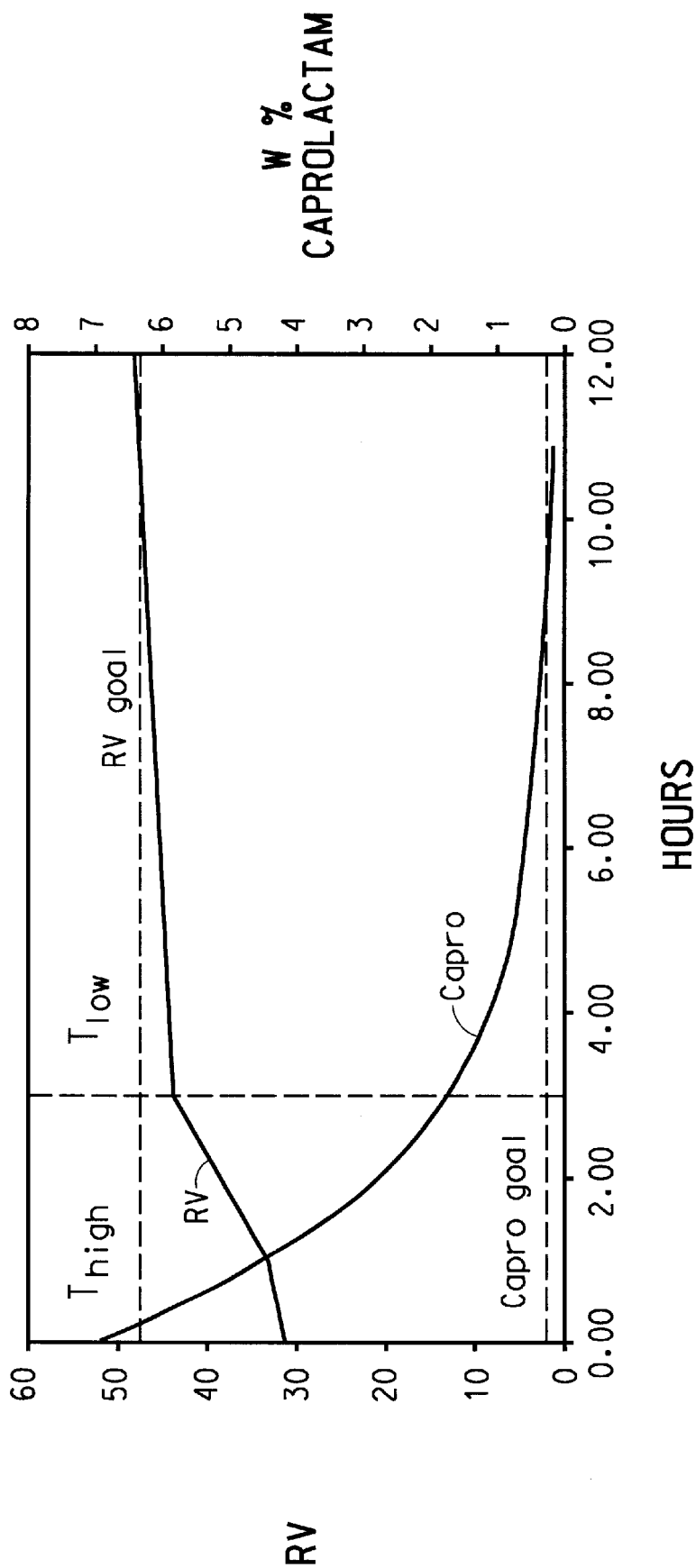
FIG. 3 is a graph showing the relative viscosity and caprolactam content of nylon 6 treated by a two-temperature method in accordance with the present invention.

FIG. 3 shows a simulation result for a two stage heating process where the polymer is preheated for three hours at an elevated temperature ($T_{high}$) then is cooled significantly, and the polymerization and volatile removal are allowed to continue for a time at the lower temperature ($T_{low}$). Note that if $T_{high}$ and $T_{low}$ and the times are properly chosen for the particular polymer being processed, the RV reaches its goal of 48 after the caprolactam falls below the specified limit of 0.2 w %.

The temperatures and times must be determined experimentally for each polymer sample. The starting RV, caprolactam content, particle shape and size and the relative amine and carboxyl end content all affect the processing conditions. A variety of additives to the polymer may also affect the relative rate of molecular weight build at a given temperature. Processing of the polymer especially the thermal history of the polymer before solid phase processing will affect the temperatures and times used. For these reasons some degree of small scale testing is required to establish optimal processing parameters.

In this description the term "molecular weight" is used to characterize the average size of the nylon 6 molecule created by the present process. Degree of polymerization (DP), relative viscosity (RV), intrinsic viscosity, solution viscosity, melt viscosity or any other direct or indirect measurement of the average polymer molecule length also may be used.

The following procedure may be used to carry out the present process:

Before heat treatment the nylon 6 may be melted and pelletized by any technique known to the art or may be cut and or ground to a granular material. This may result in some lowering of caprolactam and increase in polymer molecular weight due to the effect of heat, volatilization or water quenching of molten or hot pellets.

Before conducting this process at large scale it is necessary to characterize the particular polymer to be processed and to determine the optimal temperatures and times required to achieve the desired final molecular weight and caprolactam content. This polymer testing is done at small scale, and then the resulting temperatures and times are utilized at full scale.

Step (1) Obtain a small sample of the granular or pelletized nylon 6 to be treated.

Step (2) Analyze the sample for molecular weight and for caprolactam and higher oligomers and for amine and carboxylic end groups.

Step (3) Heat the sample in a nitrogen purged vessel to the desired temperature (T1) and maintain the sample at this temperature for some time period (t1). T1 should be between 130 degrees C. and 220 degrees C. The maximum T1 will be limited by the tendency of the polymer granules to melt or stick together. This maximum T1 (softening temperature) can be predetermined by Differential Scanning Calorimetry (DSC). The minimum T1 will be determined by the time allowed for changes in the polymer to occur. The lower T1 is, the longer it is necessary to maintain the sample at T1 to allow the polymer to respond. The sample should be maintained at T1 for a time sufficient to raise the molecular weight of the sample by 5% to 95% of the difference between the initial molecular weight and the desired molecular weight. The time period t1 is expected to be from 5 minutes to 12 hours.

Step (4) After maintaining the sample at T1 for t1 quickly cool the sample to room temperature.

Step (5) Analyze the sample for new values of molecular weight, caprolactam and other oligomers.

Steps (1) to (5) may need to be repeated several times to determine optimal values of T1 and t1.

Step (6) Obtain another fresh sample of the granular or pelletized polymer and treat as was done before in step (3) at temperature T1 for time t1.

Step (7) At time t1 lower the temperature of the sample to T2, where T2 is at least 1 degree centigrade below T1.

Step (8) Maintain sample at T2 until t2, where t2 is from 0.5 to 12 hours greater than t1.

Step (9) After maintaining the sample at T2 for t2 quickly cool the sample.

Step (10) Analyze the sample for new values of molecular weight, caprolactam and other oligomers.

Steps (6) through (10) may be repeated, as needed, using different values for T2 and t2 until a combination of T1, T2, t1, t2 is found that gives an acceptable molecular weight and residual content of caprolactam and other oligomers. The process may also involve reheating the sample after step (8) to a temperature T2 equal to or less than T1 and maintaining the sample at T2 for a time sufficient to achieve the desired caprolactam content and the desired molecular weight.

This process of determining the optimal T1, t1, T2, t2 can be greatly facilitated through the use of a kinetic model for solid phase polymerization combined with a model of caprolactam and oligomer drying behavior. A skilled practitioner of the art can develop or obtain details for such models in the scientific literature.

Implementation of the present process would typically be done in a continuous process by;

(1) Feeding granulated polymer into some form of inert gas-swept, agitated (fluidized bed or mechanically agitated) preheater, most preferably with a plug flow type of residence time distribution and with an average residence time of t1, where the polymer is quickly heated to temperature T1; (Gas from the preheater may be discharged with the polymer into the column or vented separately for recovery of volatiles.)

(2) Discharging the polymer at T1 from the preheater into a vertical vessel, typically referred to as a solid state polymerization column, where nitrogen flowing up from the bottom of the column would cool the polymer to T2 and carry caprolactam, water and other volatiles out of the column for recovery by condensation or some other common methods known to the skilled practitioner. The polymer would be retained in the column for a time t2, whereupon it would be discharged and immediately cooled to stop the buildup of molecular weight.

An alternative embodiment of the present process could be implemented in a semi-batch fashion by;

(1) Feeding the polymer to a preheater where the polymer to is heated to T1; then (2) Discharging the polymer from the preheater into a vertical vessel (solid phase polymerization column) where it is held for a time t1 at temperature T1; (The column will be swept from bottom to top with a heated stream of inert gas that will carry volatiles from the polymer and maintain the polymer at T1.)

(3) After holding for time t1, cooling the polymer to the intermediate temperature, previously determined by small-scale experimentation, either by discharging from the column through a heat exchanger or by injection of cold gas into the column; (The goal is to uniformly heat treat the polymer so that heatup rate and cool down rates are matched so that all of the polymer is subject to the same thermal history.)

(4) Feeding the cooled polymer back to the column through a preheater where it is heated to the desired temperature, most preferably T1, although lower temperatures can be used;

(5) Holding the polymer in the solid phase polymerization column for a time t2 sufficient to allow the molecular weight to build to the desired value while the volatiles are stripped from the polymer by the inert gas sweep.

What is claimed is:

1. A process for making nylon 6 having a desired molecular weight and a desired caprolactam content, comprising (1) heating nylon 6 having an initial molecular weight less than the desired molecular weight and an initial caprolactam content greater than the desired caprolactam content to a first temperature in the range of 130 to 220 degrees centigrade in the presence of an inert gas;

(2) maintaining said first temperature for a time sufficient to raise the molecular weight of the nylon 6 by 5% to 95% of the difference between said initial molecular weight and the desired molecular weight;

(3) lowering the temperature of said nylon 6 to a second temperature at least 1 degree centigrade below said first temperature; and (4) maintaining said second temperature for a time sufficient to achieve the desired caprolactam content and the desired molecular weight.

2. A process for making nylon 6 having a desired molecular weight and a desired caprolactam content, comprising (1) heating nylon 6 having an initial molecular weight less than the desired molecular weight and an initial caprolactam content greater than the desired caprolactam content to a first temperature in the range of 130 to 220 degrees centigrade in the presence of an inert gas;

(2) maintaining said first temperature for a time sufficient to raise the molecular weight of the nylon 6 by 5% to 95% of the difference between said initial molecular weight and the desired molecular weight;

(3) allowing the nylon 6 to cool at least 1 degree centigrade below the first temperature of step (1);

(4) re-heating the nylon 6 to a second temperature equal to or less than the first temperature of step (1); and (5) maintaining said second temperature for a time sufficient to achieve the desired caprolactam content and the desired molecular weight.

* * * * *